US012674423B2

(12) United States Patent
Lhomme et al.

(10) Patent No.: US 12,674,423 B2
(45) Date of Patent: Jul. 7, 2026

(54) TURBINE ENGINE COMPRISING AN ACTUATOR AND AIRCRAFT COMPRISING SUCH A TURBINE ENGINE, AND CORRESPONDING ACTUATION METHOD

(71) Applicant: SAFRAN POWER UNITS, Toulouse (FR)

(72) Inventors: Victor Georges Maurice Lhomme, Moissy Cramayel (FR); Pascal Paul Rémy Truchet, Moissy Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 0 days.

(21) Appl. No.: 19/135,844

(22) PCT Filed: Dec. 1, 2023

(86) PCT No.: PCT/FR2023/051887
§ 371 (c)(1),
(2) Date: Jun. 5, 2025

(87) PCT Pub. No.: WO2024/126919
PCT Pub. Date: Jun. 20, 2024

(65) Prior Publication Data
US 2026/0002474 A1     Jan. 1, 2026

(30) Foreign Application Priority Data
Dec. 13, 2022     (FR) ...................................... 2213255

(51) Int. Cl.
F02C 7/32        (2006.01)
(52) U.S. Cl.
CPC .......... F02C 7/32 (2013.01); F05D 2220/323 (2013.01); F05D 2220/50 (2013.01);
(Continued)

(58) Field of Classification Search
CPC .... F05D 2260/57; F05D 2270/65; F02C 6/08; F02C 6/06; F02C 9/20; F02C 9/54; F02K 1/763
See application file for complete search history.

(56) References Cited

U.S. PATENT DOCUMENTS 2,917,288 A * 12/1959 Sims, Jr. ................ B64D 13/06
                                                    236/80 R
5,095,804 A    3/1992  Burch
(Continued)

FOREIGN PATENT DOCUMENTS

DE        10127205 A1    9/2002
DE    102017131004 A1    1/2019
(Continued)

OTHER PUBLICATIONS

International Patent Application No. PCT/FR2023/051887, International Search Report and Written Opinion, Apr. 16, 2024, 18 pages (5 pages of English translation and 13 pages of original document).

*Primary Examiner* — Phutthiwat Wongwian
*Assistant Examiner* — Roberto Toshiharu Igue
(74) *Attorney, Agent, or Firm* — Kilpatrick Townsend & Stockton LLP

(57)        ABSTRACT
This actuator comprises a cylinder comprising a rod provided with a piston defining first and second chambers, first and second fluid lines fluidly connected to the first chamber, a resilient return means configured to exert a force on the piston, the first fluid line comprising a calibrated port, the actuator comprising a servo-valve fluidly connected to the second fluid line, a cross-sectional area of the servo-valve being greater than or equal to ten times a cross-sectional area of the calibrated port or the head loss in the first fluid line being greater than or equal to ten times the head loss in the second fluid line.

9 Claims, 2 Drawing Sheets

(52) U.S. Cl.
       CPC ...... *F05D 2240/55* (2013.01); *F05D 2260/57*
                       (2013.01); *F05D 2270/62* (2013.01)

(56)                    References Cited

U.S. PATENT DOCUMENTS

|  |  |  |  |  |
|---|---|---|---|---|
| 7,845,575 B2 * | 12/2010 | Franconi | ............. | G05D 23/022 |
|  |  |  |  | 236/99 E |
| 10,662,801 B2 | 5/2020 | Sutherland |  |  |

FOREIGN PATENT DOCUMENTS

| EP | 1209394 | A2 | 5/2002 |
|---|---|---|---|
| EP | 1209394 | A3 | 8/2003 |
| FR | 2993943 | A1 | 1/2014 |

* cited by examiner

TURBINE ENGINE COMPRISING AN ACTUATOR AND AIRCRAFT COMPRISING SUCH A TURBINE ENGINE, AND CORRESPONDING ACTUATION METHOD

CROSS REFERENCE TO RELATED APPLICATIONS

This application is a U.S. national phase under 35 U.S.C. § 371 of International Patent Application No. PCT/FR2023/051887, filed on Dec. 1, 2023, which claims priority to French Patent Application No. 2213255, filed on Dec. 13, 2022, the entire contents of both of which are incorporated herein by reference.

TECHNICAL FIELD

The present invention relates to the technical field of fast actuators.

In particular, the present invention relates to an actuator, a turbine engine and an aircraft containing such an actuator, as well as a corresponding actuation method.

PRIOR ART

Some applications, particularly aircraft applications, require actuators having fast movement dynamics, which some actuators do not have.

For example, an electropneumatic actuator has a slower motion dynamics than a fuel actuator.

A fuel actuator is for example a hydraulic actuator controlled from a pressure taken from a fuel circuit supplying the combustion of a gas turbine.

Installing a fuel actuator on a machine requires a complex machine architecture. The fuel demand of the fuel actuator can lead to an oversizing of a fuel circuit of the machine which can lead to leaks or a syringing effect.

The machine can create an environment of high temperatures and intense vibrations making it difficult to integrate the actuator and may prevent the implementation of certain types of actuators, such as an electric actuator.

DISCLOSURE OF THE INVENTION

The object of the present invention is therefore to overcome all or part of the aforementioned drawbacks and to provide an actuator with fast movement dynamics compatible with the thermal and vibration conditions of an aircraft.

The object of the invention is an actuator comprising a cylinder comprising a rod provided with a piston at least partially defining a first and a second chamber, the actuator comprising a first and a second fluid line fluidly connected to the first chamber, a resilient return means in a predetermined position disposed in one of the first and second chambers and configured to exert a force on the piston, the first fluid line comprising a calibrated port, the actuator comprising a two-way servo-valve fluidly connected to the second fluid line, a cross-sectional area of the servo-valve being greater than or equal to ten times a cross-sectional area of the calibrated port or the head loss in the first fluid line being greater than or equal to ten times the head loss in the second fluid line.

The large cross-sectional area of the servo-valve compared to the reduced cross-sectional area of the calibrated port makes it possible to obtain a large dynamic of a movement of the piston in a first direction, particularly when returning the resilient means to the predetermined position, and a lower dynamic of another movement of the piston in a second direction opposite to the first direction.

Using the two-way servo-valve ensures a simple actuator design.

The design of the actuator is compatible with the thermal and vibration conditions of an aircraft.

The actuator may comprise a common line opening into the first chamber, the first and second fluid lines being fluidly connected to the common line.

The two-way servo-valve may comprise an electromagnetic control.

In one embodiment, the two-way servo-valve is configured to have at least one passing state so that a fluid can flow in the second fluid line through the two-way servo-valve and a blocking state so that a fluid cannot flow in the second fluid line through the two-way servo-valve.

The two-way servo-valve may comprise a proportional control configured to position the piston in an intermediate position of a stroke of the piston.

The piston can be associated with a sealed rolling membrane to seal the first and second chambers.

The cross-sectional area of the two-way servo-valve may be greater than twenty times the cross-sectional area of the calibrated port.

Another object of the invention is a turbine engine comprising an actuator as defined previously, a first fluid source and a second fluid source, one of the first and second fluid lines being configured to take a first fluid from the first fluid source, the other fluid line being configured to take a second fluid from the second fluid source, the pressure of the first fluid being greater than the pressure of the second fluid.

The first fluid source may comprise a compressor, the second fluid comprising air under atmospheric pressure.

Another object of the present invention is an aircraft comprising an actuator as defined above and/or a turbine engine as defined above.

Another object of the present invention is an actuation method implemented by an actuator as defined above or by a turbine engine as defined above, or by an actuator included in an aircraft as defined above, comprising the following steps of:

changing the state of the two-way servo-valve so that the two-way servo-valve is in a first state;

moving the piston and the rod in a first direction at a first speed, said movement being due to a first difference in forces acting on the piston depending at least on the pressure in the first chamber and the force exerted by the resilient return means on the piston;

and/or changing the state of the two-way servo-valve so that the two-way servo-valve is in a second state; and moving the piston and the rod in a second direction opposite to the first direction at a second speed different from the first speed, said movement being due to a second difference in forces acting on the piston depending at least on the pressure in the first chamber and on the force exerted by the resilient return means on the piston.

BRIEF DESCRIPTION OF THE DRAWINGS

Other aims, features and advantages of the invention will become apparent upon reading the following description, given solely by way of non-limiting example, and made with reference to the appended drawings wherein.

DETAILED DESCRIPTION

Figure 1:
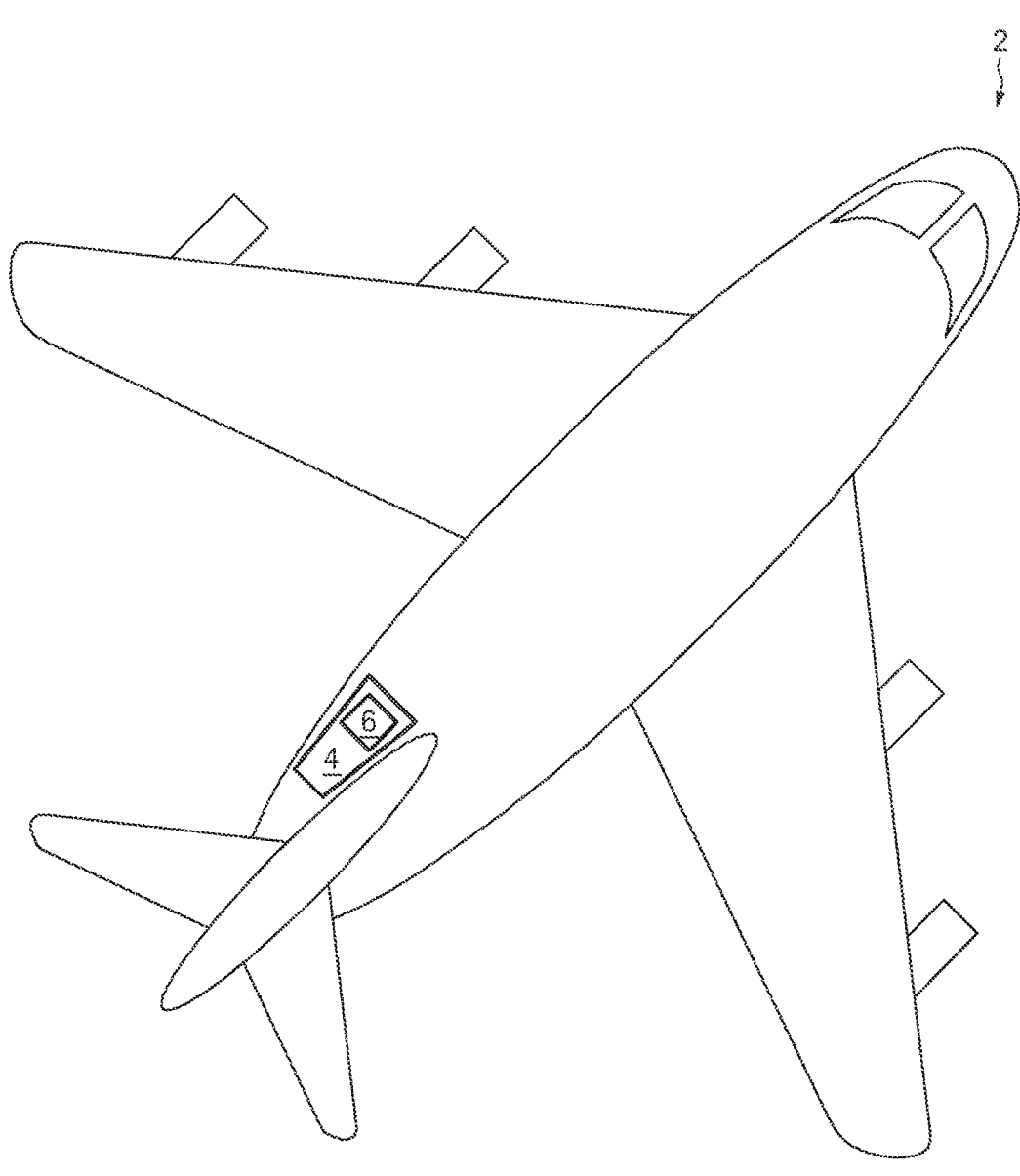
FIG. 1 schematically illustrates an aircraft comprising a turbine engine and an actuator according to the invention.

FIG. 1 schematically represents an aircraft 2, for example a helicopter or an aeroplane, comprising an auxiliary turbine engine 4 such as, for example, the turbine engine of an Auxiliary Power Unit or APU. Such an auxiliary turbine engine 4 is distinct from the turbine engines dedicated to propelling the aircraft, but like the latter, it comprises movable members requiring actuation. These moving members, also called "variable geometries", are for example Inlet Guide Vanes or IGVs and/or an anti-pumping valve. The aircraft 2 comprises, for example, a starting valve and/or an auxiliary power unit for regulating pressurized air, requiring actuation. Consequently, the aircraft comprises at least one actuator 6. However, the use of an actuator 6 according to the invention is not limited to the scope of an auxiliary turbine engine 4, the actuator 6 can be implemented in a turbine engine of a main engine (that is to say dedicated to propelling the aircraft) or in an air system of the aircraft (air conditioning, de-icing, etc.) taking pressurized air from a turbine engine.

Figure 2:
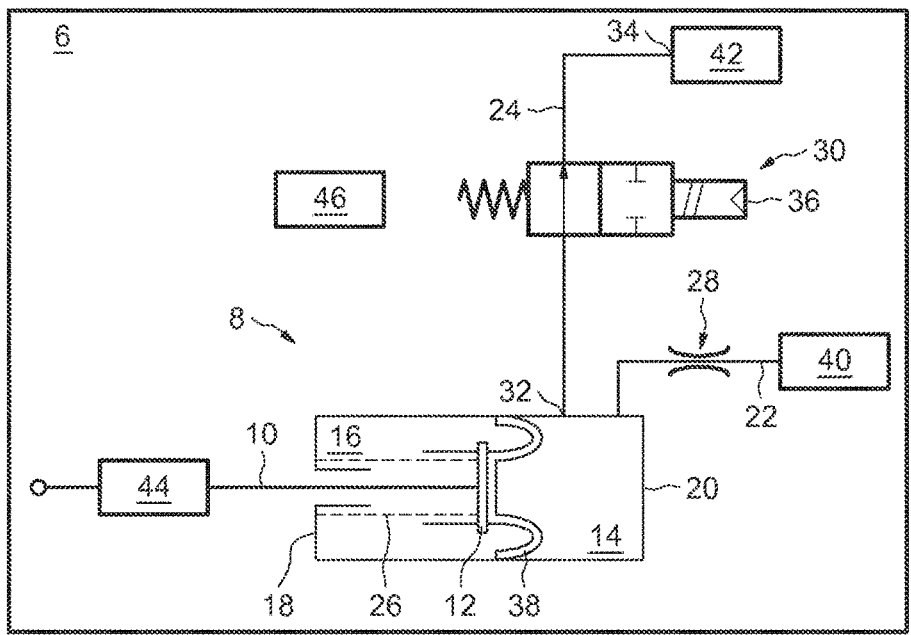
FIG. 2 schematically illustrates an actuator according to a first embodiment of the invention.

FIG. 2 schematically illustrates a first embodiment of the actuator 6.

The actuator 6 comprises a cylinder 8 comprising a rod 10 provided with a piston 12. The piston 12 defines within the cylinder 8 a first chamber 14 and a second chamber 16. The rod 10 is configured to perform a longitudinal movement in the cylinder 8. In the example shown, the rod 10 extends from the piston 12 into the second chamber 16 and passes through a first wall 18 of the cylinder 8. Alternatively, the rod 10 could extend from the piston 12 into the first chamber 14 and pass through a second wall 20 of the cylinder 8 opposite the first wall 18, the cylinder 8 then comprising a sealing element to guarantee the sealing of the first chamber 14 at the second wall 20.

The cylinder 8 comprises a first fluid line 22 fluidly connected to the first chamber 14, the first fluid line 22 being here directly connected to the first chamber 14. The cylinder 8 comprises a second fluid line 24 fluidly connected to the first chamber 14, the second fluid line 24 being here directly connected to the first chamber 14.

The cylinder 8 comprises a resilient return means 26 in a predetermined position disposed in the second chamber 16 and capable of exerting a force on the piston 12, the resilient return means 26 comprising, for example, a helical spring surrounding the rod 10 so as to exert a longitudinal force on the piston 12 during the longitudinal movement of the piston 12. Alternatively, the resilient return means 26 can be disposed in the first chamber 14.

The first and second fluid lines 22, 24 are for example tubular pipes with a constant cross-section.

The first fluid line 22 comprises a calibrated port 28 comprising, for example, a restriction port locally reducing the cross-section of the first fluid line 22 so that the first fluid line 22 locally has a smaller cross-section than a constant cross-section of the second fluid line 24. The calibrated port 28 is particularly capable of modifying the pressure and/or the flow rate of a fluid flowing in the first fluid line 22, said fluid being preferably gaseous. The actuator 6 comprises a two-way servo-valve 30 fluidly connected to the second fluid line 24. In a particular embodiment, the two-way servo-valve 30 is connected directly to the second fluid line 24 so that a fluid flowing from a first end 32 of the second fluid line 24 to a second end 34 of the second fluid line 24 necessarily flows through the two-way servo-valve 30, the first end 32 being here directly connected to the first chamber 14.

The flow of a fluid through the first fluid line 22 is limited by a cross-sectional area of the calibrated port 28, the flow of a fluid through the second fluid line 24 being limited by a cross-sectional area of the two-way servo-valve 30, the cross-sectional area of the two-way servo-valve 30 being greater than or equal to ten times a cross-sectional area of the calibrated port. Alternatively, the ratio of the two cross-sectional areas may be less than ten provided that the head loss in the first fluid line 22 is greater than or equal to ten times the head loss in the second fluid line 24.

Preferably, the two-way servo-valve 30 comprises an electromagnetic control 36. The electromagnetic control 36 does not take up much space, requires low electrical operating power and offers high responsiveness. Alternatively, the two-way servo-valve 30 may comprise a hydraulic or electrical control.

In this first embodiment, the two-way servo-valve 30 comprises only a first state and a second state. For example, the first state corresponds to a passing state of the two-way servo-valve 30, that is to say a state wherein a fluid can flow through the two-way servo-valve 30 and therefore through the second fluid line 24, the second state corresponding to a blocking state of the two-way servo-valve 30, that is to say a state wherein a fluid cannot flow through the two-way servo-valve 30 and therefore through the second fluid line 24.

Advantageously, the piston 12 comprises a sealing element configured to prevent fluid from flowing between the first and second chambers 14, 16. In the example shown, the actuator 6 comprises a sealed rolling membrane 38 associated with the piston 12, the piston 12 and the rolling membrane 38 defining the first and second chambers 14, 16 and preventing a fluid transfer between the first and second chambers 14, 16.

The actuator 6 comprises a first fluid source 40 and a second fluid source 42.

The first fluid line 22 is capable of taking a first fluid under a first pressure. The first fluid is for example air under high pressure, particularly air under a pressure at least twice as high as air at atmospheric pressure. The first fluid is for example taken from the first fluid source 40. Preferably, the first fluid source 40 is located near the actuator 6 so as to reduce the length of the first fluid line 22. In the example shown, the first fluid is taken from a compressor, not shown, of a propulsion motor of the aircraft 2. Alternatively, the first fluid may be taken from another fluid source of the propulsion motor, for example taken from a blower.

Advantageously, the calibrated port 28 of the first fluid line 22 makes it possible for the actuator 6 to be not very disturbing for the first fluid source 40. The first fluid line 22 then takes a small amount of fluid from the first fluid source 40, the energy requirement of the first fluid source 40 being slightly increased.

The second fluid line 24 is capable of taking a second fluid under a second pressure. The second fluid is for example taken from the second fluid source 42. In the example shown, the second fluid source 42 is the atmosphere, the second fluid being the air wherein the aircraft 2 moves, the second fluid therefore being under a pressure lower than the pressure of the first fluid. The second fluid line 24 then discharges the fluid coming from the first chamber 14 and the first fluid line 22 to the atmosphere.

When the two-way servo-valve 30 is in the blocking state, the flow rate of fluid flowing in the second fluid line 24 is zero or very low, only the first fluid line 22 is capable of injecting pressurized fluid into the first chamber 14. The pressure in the first chamber 14 increases when the first fluid is injected into the first chamber 14, thus exerting a force on the piston 12 against the resilient return means 26 and an external force of the member controlled by the actuator 6. If the force exerted by the pressure in the first chamber 14 on the piston is sufficiently high, then the piston 12 is moved in the direction of the first wall 18. This movement continues until an equilibrium of the forces on the piston 12 depending on the force exerted by the resilient return means 26 on the piston 12, the flow of fluid flowing in the first fluid line 22 and the flow of fluid flowing in the second fluid line 24.

When the two-way servo-valve 30 is in the passing state, the fluid contained in the first chamber 14 is capable of flowing from the first end 32 of the second fluid line 24 to the second end 34 of the second fluid line 24. If the pressure of the fluid in the first chamber 14 is sufficiently high, the fluid contained in the first chamber 14 suddenly escapes from the first chamber 14 through the second fluid line 24, the pressure in the first chamber 14 then decreasing rapidly. The force exerted by the resilient return means 26 on the piston 12 is then greater than the force exerted by the pressure of the fluid in the first chamber 14 on the piston 12. The piston 12 then moves rapidly towards the second wall of the cylinder 20, the rapid movement of the piston 12 depending at least on the force exerted by the resilient return means 26 on the piston 12, on the difference in cross-sectional area of the first and second fluid lines 22, 24 connected to the calibrated port 28 and to the two-way servo-valve 30 and on an external force of the member controlled by the actuator 6. This movement continues until an equilibrium of the forces on the piston 12 depending at least on the force exerted by the resilient return means 26 on the piston 12, the flow of fluid flowing in the first fluid line 22 and the flow of fluid flowing in the second fluid line 24.

In the example of FIG. 2, the movement of the piston 12 towards the first wall 18 when the two-way servo-valve 30 changes from the passing state to the blocking state is slower than the movement of the piston 12 towards the second wall 20 when the two-way servo-valve 30 changes from the blocking state to the passing state. The difference in speed between these two movements depends mainly on the ratio between a section of the first fluid line 22 comprising the calibrated port 28 and a section of the second fluid line 24 comprising the two-way servo-valve 30 as well as on the ratio between the first pressure and the second pressure. The stiffness of the resilient return means 26 can also influence this speed difference. The highest speed of the movement of the piston 12 towards the second wall 20 when the two-way servo-valve 30 changes to the passing state is guaranteed by the cross-sectional area of the two-way servo-valve 30 greater than or equal to ten times the cross-sectional area of the calibrated port 28. Simultaneously or alternatively to guarantee the desired speed difference between these two movements, it can be provided that the head loss in the first fluid line 22 is greater than or equal to ten times the head loss in the second fluid line 24. Optionally, the cross-sectional area of the two-way servo-valve 30 is greater than twenty times the cross-sectional area of the calibrated port 28 to ensure a movement of the piston 12 towards the second wall 20, when the two-way servo-valve 30 changes to the passing state, much faster than the movement of the piston 12 towards the first wall 18, when the two-way servo-valve 30 changes to the blocking state. For example, the cross-sectional area of the two-way servo-valve 30 is in the order of twenty-five times the cross-sectional area of the calibrated port 28.

Preferably, the cylinder 8 comprises a position sensor 44 measuring the position of the rod 10 of the cylinder 8, the actuator 6 comprising a control unit 46 configured to emit a control signal to control the state of the two-way servo-valve 30. For example, the position sensor 44 communicates the position of the rod 10 of the cylinder 8 to the control unit 46, the control unit 46 emitting the control signal according to the communicated position.

Advantageously, the two-way servo-valve 30 is configured so that in the absence of the control signal, for example during an electrical failure of the control unit 46 or of the two-way servo-valve 30, the actuator 6 is placed in a rest position, the rest position making it possible particularly to respond to safety problems by positioning the rod 10 of the cylinder 8 in a position reducing the risks of damage to the actuator 6 and/or the turbine engine 4 and/or the aircraft 2. For example, the two-way servo-valve 30 is configured to be in the passing state in the absence of control in order to quickly place the actuator 6 in the rest position.

Figure 3:
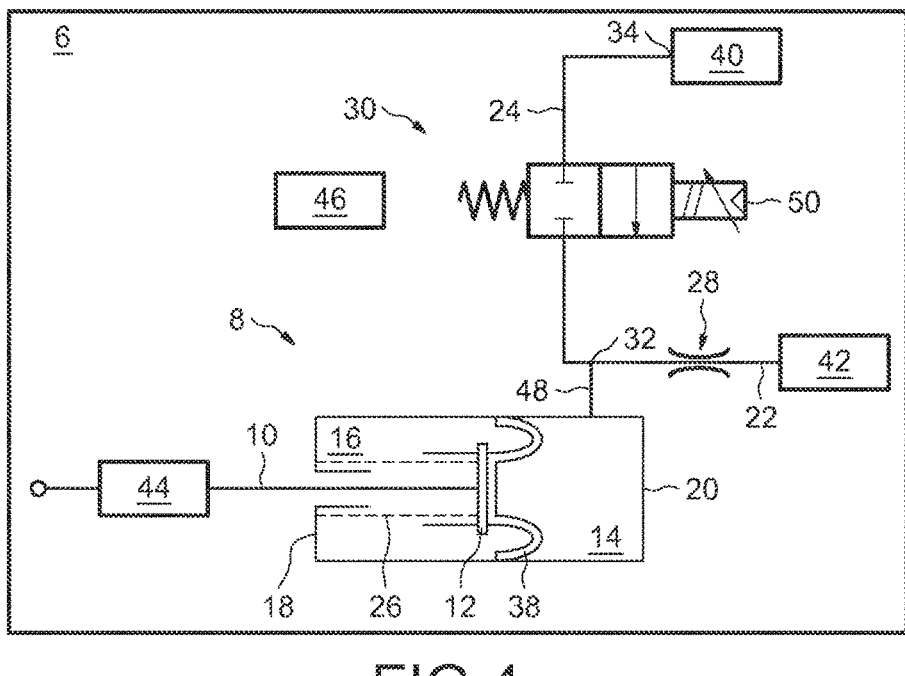
FIG. 3 schematically illustrates an actuator according to a second embodiment of the invention.

FIG. 3 schematically represents a second embodiment of the actuator 6.

The actuator 6 comprises a common line 48 opening into the first chamber 14. The first and second fluid lines 22, 24 are fluidly connected to the common line 48, the first end 32 of the second fluid line 24 being directly connected to the common line 48. This embodiment simplifies the embodiment of the actuator 6 and is also compatible with the embodiment of FIG. 2.

The first fluid line 22 is capable of taking the second fluid under the second pressure of the second fluid source 42, the second fluid line 24 being capable of taking the first fluid under the first pressure of the first fluid source 40. The first fluid line 22 comprises the calibrated port 28.

The two-way servo-valve 30 comprises the passing state and the blocking state.

Advantageously, the two-way servo-valve 30 is configured to be in a blocking state in the absence of control in order to quickly place the actuator 6 in the rest position.

When the two-way servo-valve 30 is in the passing state, the first fluid taken from the first fluid source 40 is capable of flowing from the second end 34 of the second fluid line 24 to the first end 32 of the second fluid line 24, then from the first end 32 of the second fluid line 24 to the first chamber 14. If the pressure of the first fluid is sufficient, then the first fluid suddenly enters the first chamber 14, the pressure in the first chamber 14 then increasing rapidly. The force exerted by the pressure of the fluid in the first chamber 14 on the piston 12 is then greater than the sum of the force exerted by the resilient return means 26 on the piston 12 and the external force of the member controlled by the actuator 6. The piston 12 then moves rapidly towards the first wall 18 of the cylinder 8, the rapid movement being made here against the force exerted by the resilient return means 26 on the piston 12. This movement continues until an equilibrium of the forces on the piston 12 depending at least on the force exerted by the resilient return means 26 on the piston 12, the flow of fluid flowing in the first fluid line 22 and the flow of fluid flowing in the second fluid line 24.

When the two-way servo-valve 30 is in the blocking state, the flow rate of fluid flowing in the second fluid line 24 is zero or very low, only the first fluid line 22 is capable of making it possible for the fluid of the first chamber 14 to escape from the cylinder 8. The pressure in the first chamber 14 decreases when the fluid of the first chamber 14 escapes from the first chamber 14 through the first fluid line 22. If the force exerted by the resilient return means 26 on the piston 12 is sufficiently high relative to the force exerted by the pressure of the fluid in the first chamber 14 on the piston 12, then the piston 12 is moved in the direction of the second wall 20. This movement continues until an equilibrium of the forces on the piston 12 depending at least on the force exerted by the resilient return means 26 on the piston 12, the flow of fluid flowing in the first fluid line 22 and the flow of fluid flowing in the second fluid line 24.

In the example of FIG. 3, the movement of the piston 12 towards the first wall 18 when the two-way servo-valve 30 changes to the passing state is faster than the movement of the piston 12 towards the second wall 20 when the two-way servo-valve 30 changes to the blocking state. The highest speed of the movement of the piston 12 towards the first wall 18 when the two-way servo-valve 30 changes to the passing state is guaranteed by the cross-sectional area of the two-way servo-valve 30 greater than or equal to ten times the cross-sectional area of the calibrated port 28. Simultaneously or alternatively to guarantee the desired speed difference between these two movements, it can be provided that the head loss in the first fluid line 22 is greater than or equal to ten times the head loss in the second fluid line 24. The head loss in the common line 48 will preferably be comparable or lower than that in the second fluid line 24. Optionally, the cross-sectional area of the two-way servo-valve 30 is greater than twenty times the cross-sectional area of the calibrated port 28 to ensure a movement of the piston 12 towards the first wall 18 when the two-way servo-valve 30 changes to the passing state much faster than the movement of the piston 12 towards the second wall 20 when the two-way servo-valve 30 changes to the blocking state.

Advantageously, the two-way servo-valve 30 comprises a proportional control 50 capable of positioning the piston 12 in an intermediate position of the stroke of the piston 12. For example, the control unit 46 of the actuator 6 controls the proportional control 50 of the two-way servo-valve 30 in an intermediate flow state so as to control the flow of air passing through the two-way servo-valve 30 and thus the second fluid line 24.

The control unit 46 is configured to servo-control the piston 12 of the cylinder 8 in position. The control unit 46 comprises a control algorithm for servo-controlling the position of the piston 12 particularly according to the position data of the position sensor 44. The control unit 46 makes it possible to quickly position the piston 12 in an intermediate position of the stroke of the piston 12.

The two-way servo-valve 30 cooperates with the first and second fluid lines 22, 24 and with the resilient return means 26 to place the piston 12 in the intermediate position of the stroke of the piston 12 when the two-way servo-valve 30 is in the intermediate flow state.

The intermediate position corresponds to an equilibrium of the forces exerted on the piston 12 depending on a stiffness of the resilient return means 26, a flow rate of fluid flowing in the first fluid line 22 and a flow rate of fluid flowing in the second fluid line 24 when the two-way servo-valve 30 is in the intermediate flow state.

Figure 4:
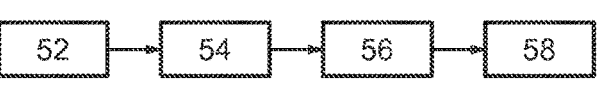
FIG. 4 schematically illustrates an actuation method according to the invention.

FIG. 4 schematically represents an actuation method implemented by the actuator 6.

During a first state change step 52 of the two-way servo-valve 30, the operating state of the two-way servo-valve 30 is modified so that the two-way servo-valve 30 is in a first state.

The first state comprises for example a passing state or a blocking state or an intermediate flow state of the two-way servo-valve 30.

Subsequently, during a first step of moving 54 the piston 12, the piston 12 and the rod 10 of the cylinder 8 are moved in a first direction at a first speed, for example to bring the piston 12 closer to the first wall 18 or to the second wall 20. The movement of the piston 12 during step 54 is due to a first difference in forces acting on the piston 12 depending at least on the pressure in the first chamber 14 and on the force exerted by the resilient return means 26 on the piston 12. An external effort is also to be taken into account, for example an external effort of the member controlled by the actuator 6. Preferably, the movement of the piston 12 during the step 54 ends when an equilibrium of the forces acting on the piston 12 is reached.

As a result, during a second state change step 56 of the two-way servo-valve 30, the operating state of the two-way servo-valve 30 is modified so that the two-way servo-valve 30 is in a second state.

The second state comprises for example a passing state or a blocking state or an intermediate flow state of the two-way servo-valve 30.

Finally, during a second step of moving 58 the piston 12, the piston 12 and the rod 10 of the cylinder 8 are moved in a second direction opposite to the first direction at a second speed, for example to bring the piston 12 closer to the second wall 20 or to the first wall 18. The movement of the piston 12 during step 58 is due to a second difference in forces acting on the piston 12 depending at least on the pressure in the first chamber 14 and on the force exerted by the resilient return means 26 on the piston 12, not to mention that the external force is also to be taken into account. Preferably, the movement of the piston 12 during step 58 ends when an equilibrium of the forces acting on the piston 12 is reached.

Step 52 comprises, for example, in the case of the example of embodiment of FIG. 2, changing from the passing to blocking state of the two-way servo-valve 30 when the piston 12 is in an established passing state position corresponding to the end of a first transient speed of the movement of the piston 12. Step 54 then comprises moving the piston 12 from the established passing state position towards the first wall of the cylinder 18, the movement of the piston 12 ending when the piston 12 is in an established blocking state position corresponding to the end of a second transient speed of the movement of the piston 12.

Step 56 comprises, for example, in the case of the example of embodiment of FIG. 2, changing from the blocking state to the passing state of the two-way servo-valve 30 when the piston 12 is in the established position of blocking state. Step 58 then comprises moving the piston 12 from the established blocking state position towards the second wall of the cylinder 20, the movement of the piston 12 ending when the piston 12 is in the established passing state position. In this example, the movement of the piston 12 during step 54 is slower than the movement of the piston during step 58.

Of course, steps 54 and 58 may comprise moving the piston 12 from the intermediate position of the stroke of the piston 12 to another position, or moving the piston 12 from the other position to the intermediate position of the stroke of the piston 12 or any other movement of the piston 12.

The actuation method comprises in order steps 52, 54, 56 and 58. Alternatively, such an actuation method may comprise only steps 52 and 54 or 56 and 58. Alternatively, the method may also comprise in order steps 56, 58, 52 and 54.

The invention claimed is:

1. Turbine engine comprising an actuator comprising a cylinder comprising a rod provided with a piston defining at least partially within the cylinder a first chamber and a second chamber, the actuator comprising a first fluid line and a second fluid line both fluidly connected to the first chamber, a resilient return means in a predetermined position disposed in one of the first chamber or the second chamber and configured to exert a force on the piston, the first fluid line comprising a calibrated port, the actuator comprising a two-way servo-valve fluidly connected to the second fluid line, a cross-sectional area of the two-way servo-valve being greater than or equal to ten times a cross-sectional area of the calibrated port or a head loss in the first fluid line being greater than or equal to ten times a head loss in the second fluid line, the turbine engine comprising a first fluid source and a second fluid source, wherein an element chosen from among the first fluid line and the second fluid line is configured to receive a first fluid from the first fluid source, and wherein a remaining element chosen among the first fluid line and the second fluid line is configured to take a second fluid from the second fluid source, a pressure of the first fluid being greater than a pressure of the second fluid, wherein the first fluid source comprises a compressor of the turbine engine, the second fluid comprising air under atmospheric pressure.

2. Turbine engine according to claim 1, wherein the actuator comprises a common line opening into the first chamber, the first fluid line and the second fluid line both being fluidly connected to the common line.

3. Turbine engine according to claim 1, wherein the two-way servo-valve comprises an electromagnetic control.

4. Turbine engine according to claim 1, wherein the two-way servo-valve is configured to have at least one passing state so that a fluid can flow in the second fluid line through the two-way servo-valve and a blocking state so that a fluid cannot flow in the second fluid line through the two-way servo-valve.

5. Turbine engine according to claim 1, wherein the two-way servo-valve comprises a proportional control configured to position the piston in an intermediate position of a stroke of the piston.

6. Turbine engine according to claim 1, wherein the piston is associated with a sealed rolling membrane to sealingly separate the first chamber and the second chamber.

7. Turbine engine according to claim 1, wherein the cross-sectional area of the two-way servo-valve is greater than twenty times the cross-sectional area of the calibrated port.

8. Aircraft comprising the turbine engine according to claim 1.

9. Actuation method implemented by the actuator included in a turbine engine according to claim 1, comprising the following steps of:

changing the state of the two-way servo-valve so that the two-way servo-valve is in a first state;

moving the piston and the rod in a first direction at a first speed, said movement being due to a first difference in forces acting on the piston depending at least on the pressure in the first chamber and the force exerted by the resilient return means on the piston;

and/or changing the state of the two-way servo-valve so that the two-way servo-valve is in a second state; and moving the piston and the rod in a second direction opposite to the first direction at a second speed different from the first speed, said movement being due to a second difference in forces acting on the piston depending at least on the pressure in the first chamber and the force exerted by the resilient return means on the piston.

* * * * *